G. A. JULIUS & F. A. WILKINSON.
MANUALLY CONTROLLED MACHINE FOR PRINTING AND ISSUING DIFFERENTIATED TICKETS
AND RECORDING THE ISSUE THEREOF.
APPLICATION FILED MAY 21, 1918.

1,288,910.

Patented Dec. 24, 1918.
8 SHEETS—SHEET 1.

Inventors.
G. A. Julius.
F. A. Wilkinson.
By L. R. Kerslake.
Atty.

G. A. JULIUS & F. A. WILKINSON.
MANUALLY CONTROLLED MACHINE FOR PRINTING AND ISSUING DIFFERENTIATED TICKETS
AND RECORDING THE ISSUE THEREOF.
APPLICATION FILED MAY 21, 1918.

1,288,910.

Patented Dec. 24, 1918.
8 SHEETS—SHEET 7.

Inventors
G. A. Julius.
F. A. Wilkinson.
By H. R. Kerslake
Atty.

UNITED STATES PATENT OFFICE.

GEORGE ALFRED JULIUS, OF SYDNEY, AND FREDERICK AUGUSTUS WILKINSON, OF SANS SOUCI, NEAR SYDNEY, NEW SOUTH WALES, AUSTRALIA.

MANUALLY-CONTROLLED MACHINE FOR PRINTING AND ISSUING DIFFERENTIATED TICKETS AND RECORDING THE ISSUE THEREOF.

1,288,910.   Specification of Letters Patent.   Patented Dec. 24, 1918.

Application filed May 21, 1918. Serial No. 235,823.

*To all whom it may concern:*

Be it known that we, GEORGE ALFRED JULIUS and FREDERICK AUGUSTUS WILKINSON, subjects of the King of Great Britain and Ireland, residing, respectively, at Culwulla Chambers, Castlereagh street, Sydney, New South Wales, Australia, and Maidstone Promenade, Sans Souci, near Sydney aforesaid, have invented new and useful Improvements in Manually-Controlled Machines for Printing and Issuing Differentiated Tickets and Recording the Issue Thereof, of which the following is a specification.

This invention relates to machines for printing and issuing totalizator tickets, for recording the issues of such tickets, and for transmitting electrical impulses to recording and indicating mechanism.

In the accompanying drawings.

The drive shaft 30 carries a belt pulley 31, and power is transmitted through a belt 32, via this pulley, to the shaft 30, the belt 32 being driven from a pulley on a motor turning at constant speed. The shaft 30 is carried in bearings 33 and 34, in which it is free to float endwise. 35 are anti-friction collars abutting against the inner end of the bearing 33, and taking the abutment of a helical spring 36 in compression, which bears against the male member 37 of a clutch, said male member being pinned to the shaft 30 at 38. The spring 36 tends to keep the male member 37 of the clutch normally pressed into the clutch cup 39, so providing a frictional engagement between the shaft 30 and the driving pinion 40. When the shaft 30 is moved to the left against the compression of the spring 36, the clutch is disengaged and motion is no longer transmitted to the pinion 40. This release movement is effected by means of a bell crank restoring lever 44 mounted on an arbor 41; its work arm being fitted with an adjustable pin 42 acting against a ball thrust 43. The power arm of the lever 44 is normally engaged by a hook pawl 45, which engages an offset check 46 on the tail of it and holds it down. Said pawl is carried on an arbor 47 and is normally held in locked position by a wound spring 48, which tends to move it over to hold its tooth in engagement with the check 46. The tail piece 49 of this pawl is engageable by an adjustable striker 50 on the end of the sear lever 51. The sear lever is fulcrumed on an arbor 52, and its upward extension is hooked back to a set pin 53 by a helical spring 54 in tension. Said spring acts to cant the sear lever inward so as to cause the striker 50 to throw upward against the striker block 55 on the pawl tail 49. An offset tooth 56 on the tail piece 134 of the sear lever 51 is engageable by a trigger pawl 57, which is operated by the armature 58 of a "starting magnet" 59. A heel piece 60 is fitted on said armature with a position regulating screw 61, and an adjustable retrieving spring 62, which spring operates to lift the armature 58 and depress the trigger pawl 57. At the extreme lower end of the tail piece 134 of the sear lever 51, said lever is articulated by an adjustable link 63 to a bell crank 64, which carries a long slide crank pin 65. This crank pin slides in the eye of an arm 66 on a collar 67, which is armed with a locking sector 68, which co-acts, with the bolt 69 on the selector arm 78 to hold the selector key in plunged position for a predetermined interval after it has been plunged and while the ticket printing operation is in progress. The bell crank 64 is freely rotatable on an arbor 275 concentric with the horse spindle 70. Said spindle is carried at its ends in brackets 72 mounted on the machine base 73. This horse spindle 70 carries slidably and rotatably the radial bracket arms 74 which carry the printing sector 208; said arms at the base are united by a stout collar portion 76, which is clamped on a long sleeve 77, which provides a long bearing on the horse spindle 70 and so facilitates endwise sliding movement of the sector 208 under command of the selector arm 78. Said selector arm is traversable over the tracker deck 79, so that the tracker pin 80 may be plunged in any one of the tracker holes 81 in the tracker desk 79.

The tracker desk is covered by a false face plate 284, between which and the face plate of the desk, slip slides 283 are fitted. When a horse or competitor is "scratched," the corresponding tracker hole is covered over by means of its slide 283, so that accidental plunging of the selector arm in the closed holes is prevented, and so accidental issue of tickets on a scratched horse or competitor is provided against. The outer end of the selector arm 78 is fitted with a hand knob 82 directly above the plunging pin 80; it is mounted on a fulcrum pin 83, supported by the forward brackets 74 of the segment frame, and its vertical movement is limited by a check pin 84 passing through a slot 85 in its tail portion 86, the pin 84 being carried by the rear frames 74 of the segment. At its extreme outer end, the tail piece 86 is anchored down to a lug 87 by a helical spring 88 in tension, and the pin 89 which carries the upper hanging of the spring 88 suspends also the pendent bolt 69, which co-acts with the quadrant 68 to operate as a lock, for a purpose hereinafter described.

On reference to Fig. 3 it will be observed that all rotational or transverse movements applied to the selector arm 78, move the segment table 208 so as to bring one of the printing blocks 207 mounted upon it into register below the reciprocating platen pad 195. This is so because the selector arm is carried by the spoke frames or radial arms 74 which carry the segment 208. The whole structure mounted on the rotatable and slidable sleeve 77 is movable on the horse spindle 70 quite readily, so that the positioning of the segment is effected with almost nominal mechanical effort. The long sliding crank pin 65 serves to transmit the rotary movement of the arm 64 to the arm 66 in whatever position the frame 74 occupies, according to the positioning of the selector arm. A helical spring 282 in tension serves to balance the weight of the segment 208 with the type thereon, so as to minimize the mechanical effort required for moving the segment from one position to another.

A downwardly offset lug 90 on the selector arm carries a bracket 91 insulated from it, and to this arm is attached a spring finger 92 carrying at its outer end a contact button 93 adapted to make electrical contact with any one of the contact buttons 94 which are arranged as a bank of contacts secreted below the tracker desk 79, and symmetrically disposed in relation to the tracker holes 81, so that when the selector arm is plunged and the pin 80 brought into one of the tracker holes, the contact button 93 will be brought down into firm contact with the corresponding button 94 in the bank of electrical contacts. Each one of the buttons 94 is connected by a line to a distant recorder and indicating machine, as for instance, any known form of electrically operated automatic totalizator, with the object that when a contact is made on any one of the buttons 94 a circuit will be completed in the manner herein described to said totalizator, and a record therein established of the issues of tickets on horses to which such buttons are respectively allocated, with the consequent addition of corresponding numbers to the grand total of all ticket issues recorded in such totalizator. The buttons 94 corresponding with the "test" positions of the selector arm are not wired to the distant totalizator.

The several connections from the buttons 94 are shown at 95 leading to a distribution board 96 to which the lines from the horse recorder electromagnets in the distant totalizator are appropriately connected.

Figure 9:
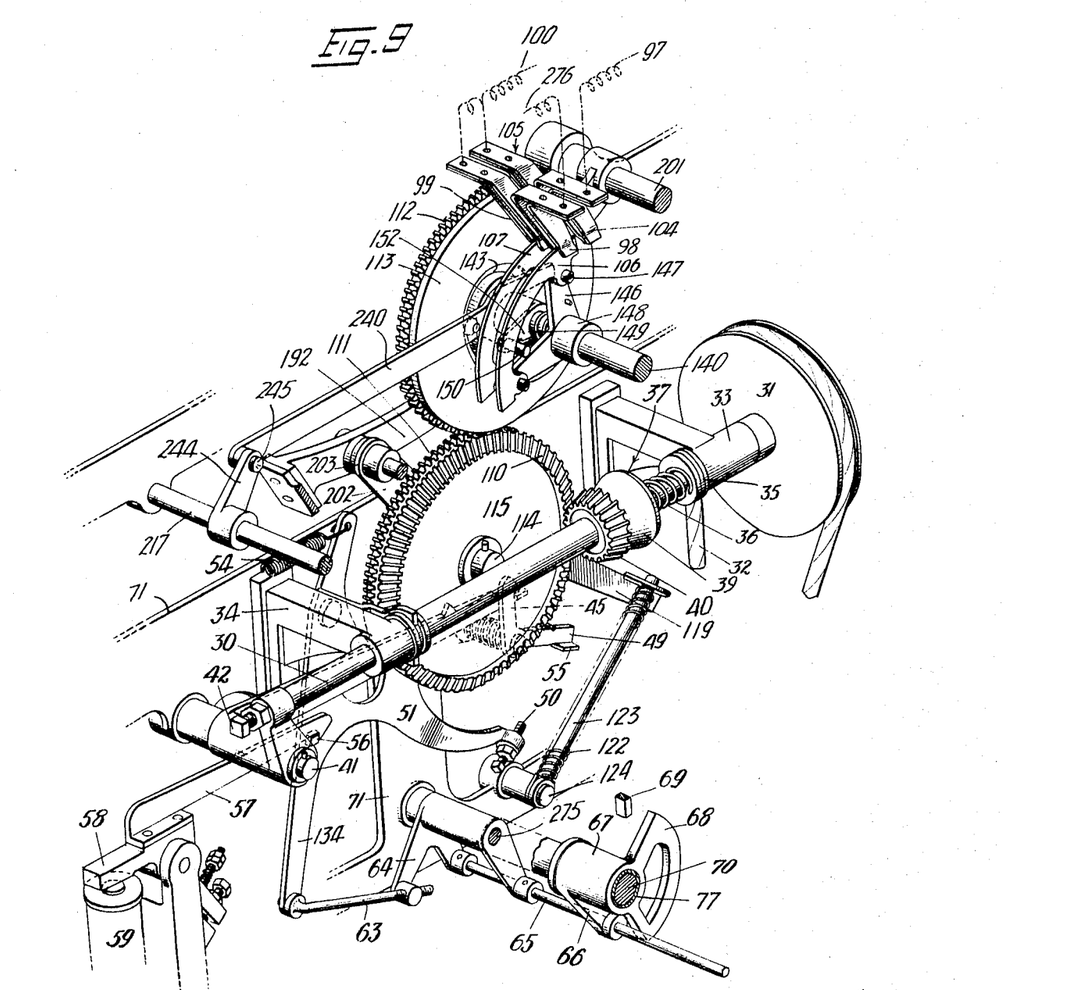
Fig. 9 is a perspective view of the machine elements viewed toward the rear from the plane of the line 6—6, Fig. 3.

It is necessary that when the selector arm is plunged that it be temporarily locked in the plunged position for a sufficient time during the performance of certain operations in the mechanism. This control is effected by the co-action of the pendent bolt 69 with the sector 68. In the idle position, the sear lever 51 (see Fig. 7) is held over to the right by the engagement of the pawl 57 with the check 56. The bell crank 64 is thus drawn over by means of the link 63, so that through the crank pin 65 the collar 67 is turned, and with it the sector 68. The collar 67 is carried on the long sleeve 77; it and the sector 68 float with the frame 74, and this floating movement is permitted by the sliding movement of the arm 66 on the long crank pin 65. In the extreme right-hand position of the sear lever, the pendent bolt 69 (see Fig. 9) may be pushed downward.

Figures 3, 5:
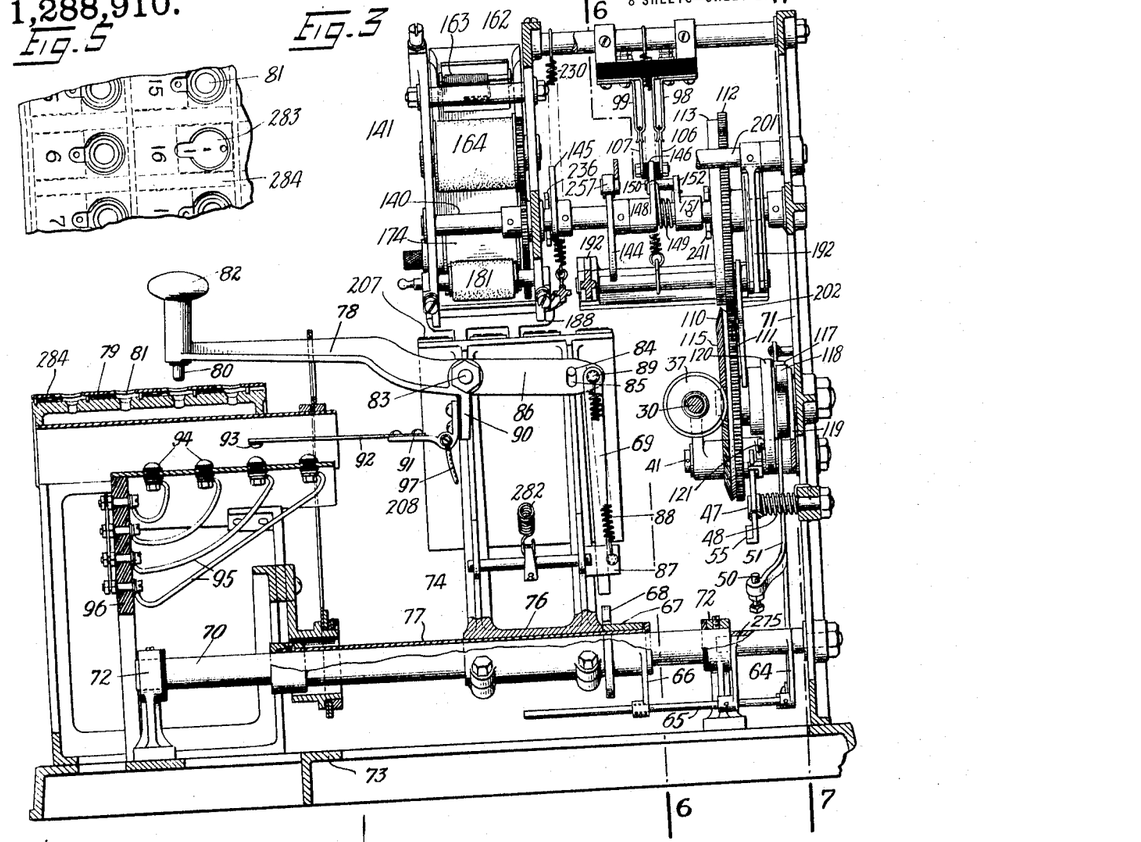
Fig. 3 is a transverse sectional elevation of the machine.
Fig. 5 is a fragment plan of the tracker desk.
Figure 4:
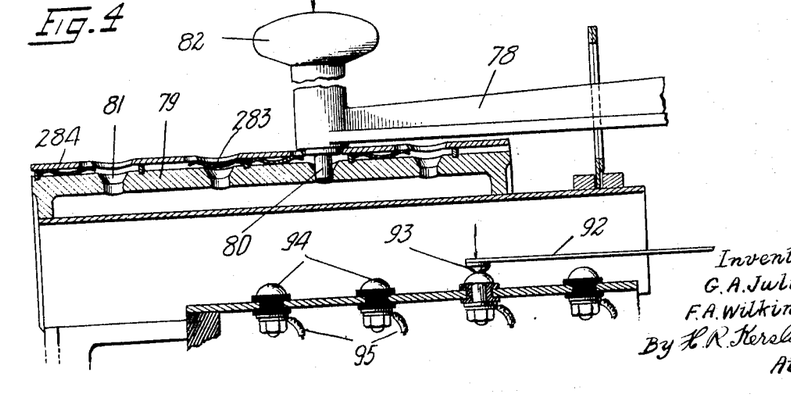
Fig. 4 is a sectional elevation on an enlarged scale, showing the selector key, the tracker desk and the recording selector switch arm, and the bank of terminals of lines, which lead to a distantly located totalizator.

In the idle position, therefore, the selector arm 78 is in the free position as shown in Fig. 3, and the electric circuits are all open. When the selector arm 78 is plunged, a circuit is completed from one of the totalizator electromagnets through the distribution board 96, and one of the leads 95 leading to that contact 94 in the bank of contacts upon which the button 93 is closed. The circuit thence continues through the spring arm 92, the bracket 91, the line 97, the starting coil 59, the line 276, and thence, via the spring contacts 98—99 and sector blades 106—107, to the line 100 leading to the battery positive. The return circuit from the totalizator is a metallic or earth circuit multiplied to the battery negative, which is at the end of the line 101. The line 101 is carried through the balancing resistance coil 102 and thence to the test contacts 103, there being one or more isolated contacts located at one corner of the bank of contacts 94. It is necessary for the purpose of testing the working of the machine that the operator shall be enabled to plunge on his test contacts and produce check tickets without making any record of an issue. The markings on these check tickets disqualify them for sale, but as all the operations of the machine must be performed in producing a check ticket, excepting those operations which are incidental to the making of a record of its issue, production of one or more check tickets provides an evidence for the operator to which he may have recourse at any time to prove that the machine is in satisfactory working condition. It will be noted that there is a spring contact 104 in the course of the line 97 leading to the starting coil 59, and a corresponding spring contact 105 at the end of the line 100 leading to the battery positive. These springs contacts are seen in their correct structural form in Fig. 3. In the idle position of the machine, the wiper quadrants 106 and 107 co-act with the spring contact blades 98 and 99, closing the circuit through them. When the selector arm is plunged, therefore, a circuit is established from the battery positive through the spring contacts 99 and 98, the sector blades 106 and 107, the starting coil 59, the line 97, spring arm 92, contact 93 thereon, one of the contacts 94 of the bank of contacts, the corresponding connecting line 95, and thence through the appropriate line in a cable 108 leading to a horse solenoid 109 in the totalizator. The totalizator is fitted with a group of coils 109, one for each of the bank contacts 94, so that only one particular solenoid 109 is energized to correspond with any particular contact 94 in the bank, through which the circuit has been closed; said contact, as before stated, corresponding with one of the tracker pin cups 81 on the tracker board 79. It will be noted that in this circuit the starting coil 59 and the totalizator coil 109 are in series, and the windings of these coils are proportioned so that the current which passes when they are in series is sufficient to energize the starting coil, but is insufficient to energize the totalizator solenoid 109. The energizing of the starting coil 59 causes its armature 58 to be pulled downward and the trigger pawl 57 to be lifted and its hook raised from the trigger lug 56. Immediately this happens, the spring 54 cants the sear lever so that its striker 50 strikes the shoe 55 of the tail of the pawl 45, thus releasing the restoring lever 44, so allowing the spring 36 to force the shaft 30 to the right and engage the clutch cone 37 in the clutch cup 39. Thereupon rotation is communicated to the pinion 40, and from that pinion to the bevel crown wheel 110. This wheel is also armed with radial gear teeth 111 which engage the gear teeth 112 on the wheel 113. On the rear side of the wheel 115 (which carries the bevel toothing 110 and the radial toothing 111) three cams are fitted; the first is a groove cam 116 which controls the motion of the printing device by which the horse number is applied to the ticket, a heart cam 117 which co-acts with a roller 118 on the end of a locator lever 119, a striker cam 120, the function of which is to reset the sear lever 51, and an offset striker pin 121, the function of which is to reset the restoring lever 44 to push the drive shaft 30 to the left and open the clutch, thereby releasing the drive. The locator lever 119 is acted on by a helical spring 122, which is carried on a guide rod 123, which is pivotally mounted at its foot 124. Said spring 122 acts on the lever 119 to keep the roller 118 pressed against the face of the cam 117 with a considerable degree of tension. The timing of these various cams is so arranged that immediately after the printing operation is effected, the sear lever 51 is restored and reëngaged by the trigger pawl 57, the shaft restoring lever 44 is replaced and reëngaged by the pawl 45, and finally the roller 118 slips into the concavity in the face of the cam 117, braking further rotation of it, and so bringing the parts to rest at zero or idle position.

Figure 7:
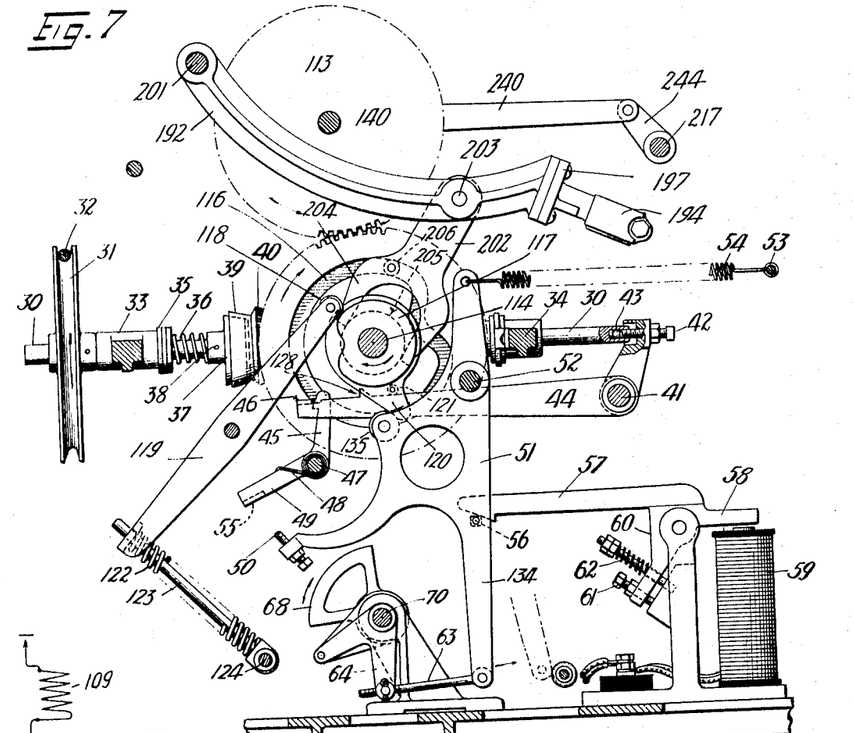
Fig. 7 is an incomplete longitudinal sectional elevation taken on the dotted line 7—7, Fig. 3, looking toward the tracker desk.

It will be noted that as the parts move toward the zero or idle position, the positive drive is released as soon as the offset striker pin 121 engages the ramp 128 on the restoring lever 44. At that moment, the motive power connection is disengaged, and thereafter, until the zero position is reached, rotational movement of the parts is due to their inertia. Following the cycle of operations from the zero position, the selector arm is brought to position with the dialing pin 80 over the tracker hole which identifies the horse or competitor on which a totalizator ticket is called for. When the arm is plunged the bolt 69 is lifted, and a circuit established as already described through the contact bank 94 to the appropriate horse solenoid 109 of the distant totalizator, and in series therewith through the starting magnet 59. If there be an interruption in the circuit, the machine refuses to operate, but if the circuit be complete, the starting magnet 59 is energized and the trigger pawl 57 raised, releasing its tooth from the check lug 56 on the sear lever 51. The sear lever is then canted by the spring 54, its toe 50 strikes the tail of the pawl 45, the restoring lever 44 is thus released, the clutch 37—39 is engaged, and the wheel 115 set in rotation. When the sear lever is in disengaged position, its tail piece 134, acting through the connection link 63 and the bell crank 64 and the sliding crank pin 65, turns the sleeve 67 with the sector 68 thereon, bringing said sector under the end of the bolt 69, thus locking the selector lever 78 in the plunged position, and holding it so locked until by the operations hereinafter described, the lock sector 68 is swung over to allow clearance for vertical downward movement of the bolt 69. When the rotation of the wheel 115 is progressed sufficiently far, the lifting face of the cam 120 acting against the roller 135 on the sear lever, pushes that lever backward toward the trigger pawl 57, until its check lug 56 is engaged by the tooth of said pawl, and said lever is thus held back in the locked or starting position. Progressing further, the restoring lever 44 is pushed down by the offset striker pin 121 and is locked down by the pawl 45, the clutch being thus thrown out of action. The sector being now canted to one side, as shown in Fig. 7, there is clearance for the bolt 69 to be moved downward, and the selector arm may therefore be canted upward by the spring 88 and so restored automatically to the open or starting position shown in Fig. 3. Meantime other motions are effected through the wheel 113. The shaft 140 to which this wheel is keyed is extended through to the housing 141 and carries a transfer gear wheel 142, through which motion is transmitted by it to the feeding, printing, and inking rollers in the train which is shown in section in Fig. 11. The detail of the mechanism contained in the housing 141 will be described subsequently.

Figure 8:
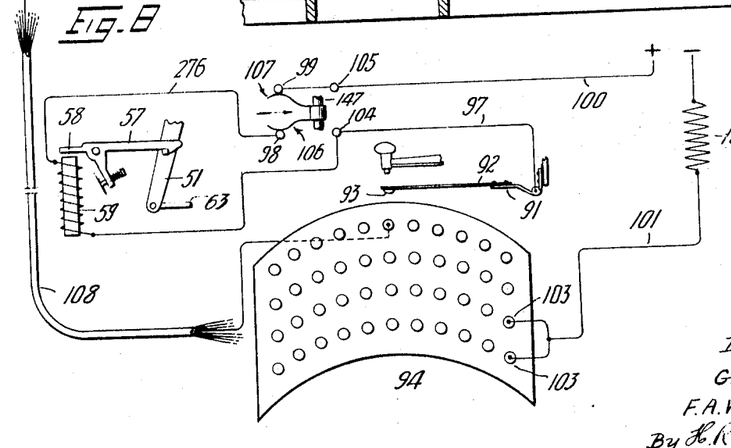
Fig. 8 is a diagram explanatory of the electric circuits in the machine.

The shaft 140 carries three cams; the first is a groove cam 143 cut in the side of the wheel 113, the second an eccentric 144, which operates the counter; the third is a drop cam 145 which operates the ticket ejector. A wing piece 146 which carries the switch quadrant blades 106—107 projects from a collar 148 rotatable on the shaft 140. These blades are electrically connected together by the bolts 147, but they are insulated from the shaft 140. The wing piece 146 is turned by a coiled spring 149 and by a crank pin 150 projecting from an arm 152 on a collar 151 which is keyed to the shaft 140. The two quadrant blades 106—107 pass between the spring jaws 98, 99, and 104, 105 successively. In the idle position of the machine they complete a circuit between the jaws 98 and 99. That position is shown diagrammatically in Fig. 8, a circuit being thereby established which enables the machine to be started as already described. As soon as rotation of the shaft 140 commences, the spring 149 is put under tension, but its dimensions are such that it is not of sufficient strength to push the quadrants 106—107 past the four contact springs 98, 99 and 104, 105, which bear frictionally against them. There is therefore a lag in its motion, but as the shaft continues to turn, the crank pin 150 moves relatively to the wing 146, until it engages its advanced spoke, and then it pushes it around positively. As the rotation of the shaft 140 continues, the crank pin continues to turn the wing 146 and the quadrant blades 106—107 mounted upon it, but before these blades leave the springs 104, 105, frictional resistance to the blade motion diminishes and the spring 149, fully wound, exerts sufficient torsion to complete the movement of the blades 106, 107, without the assistance of the crank pin 150. The unwinding of the spring is rapid and consequently a very quick break is insured, reducing risk of sparking at the contacts when the circuit is opened.

Figure 1:
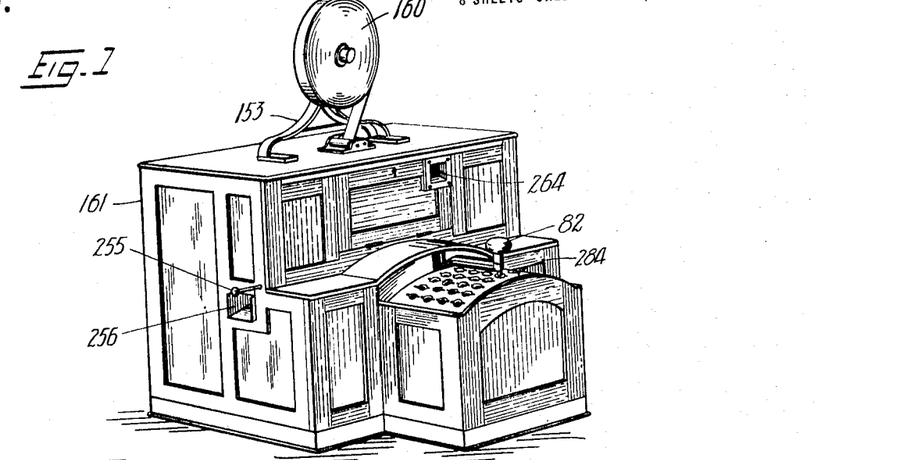
Figure 1 is a perspective view of the machine inclosed in a cabinet with the selector key standing idle over the tracker desk, and a reel of ticket paper set up on the paper spool.
Figure 2:
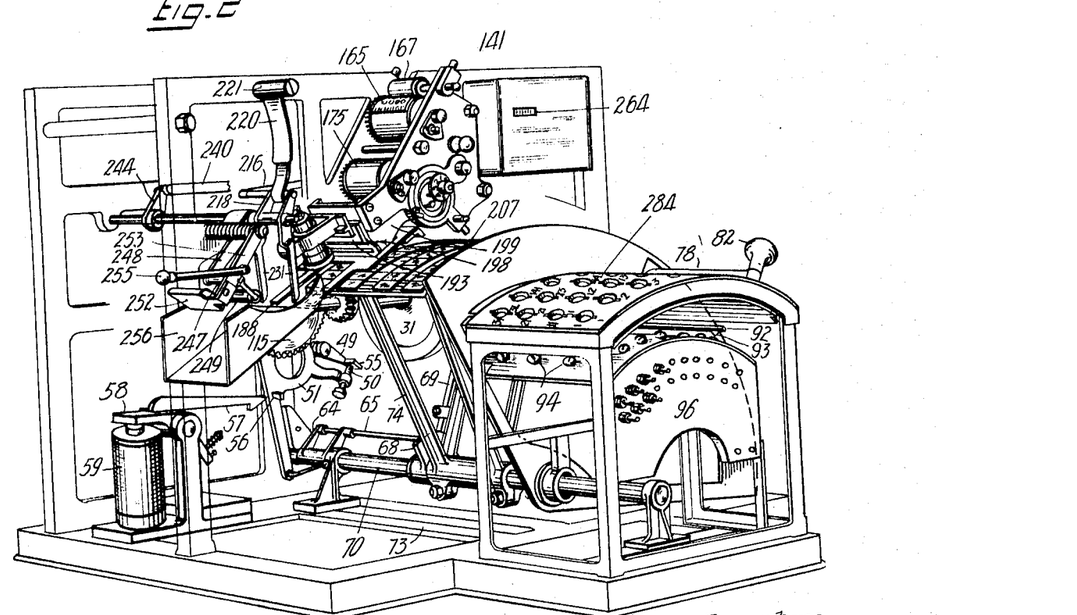
Fig. 2 is an interior perspective view of the portions of the machine which are observable from the operator's position as it appears when the cabinet is removed.

The paper spool 160 is rotatably mounted on a bracket 153 on the top of the inclosing cabinet 161 (see Fig. 1) and the paper strip unrolled therefrom is drawn into the machine and fed through it intermittently. The shaft 140 turns at a constant rate, while the machine is in action, and until the mechanism comes to the zero position, with the locator roller 118 seated home in the pocket of the cam 117. Movement is applied to the ticket strip intermittently during the rotation of the several wheels which derive their motion directly from the transfer wheel 142. The paper strip enters the receiving mouth 162 of the paper chute and is lightly pressed by a spring-backed tongue 163, which keeps it in light tension against the pull of the rollers below it; thence it passes between a platen roller 164 which is geared to the transfer wheel 142, and a type roller 165, which is geared to the roller 164. The platen roller 164 is formed with a contact surface on that arc of it which registers with the arc of the roller 165 on which the type face 166 is fixed. The paper is engaged between the type face and the contacting surface of the platen roller 164, under sufficient pressure to insure effective printing. A freely rotatable inking roller 167 rests lightly on the face of the type 166 and completely re-inks such type once in each rotation of the roller.

The inking roller 167 is carried in a slot bearing 172, which allows the roller to ride freely by its own weight upon the type face 166.

Figures 10, 11, 12:
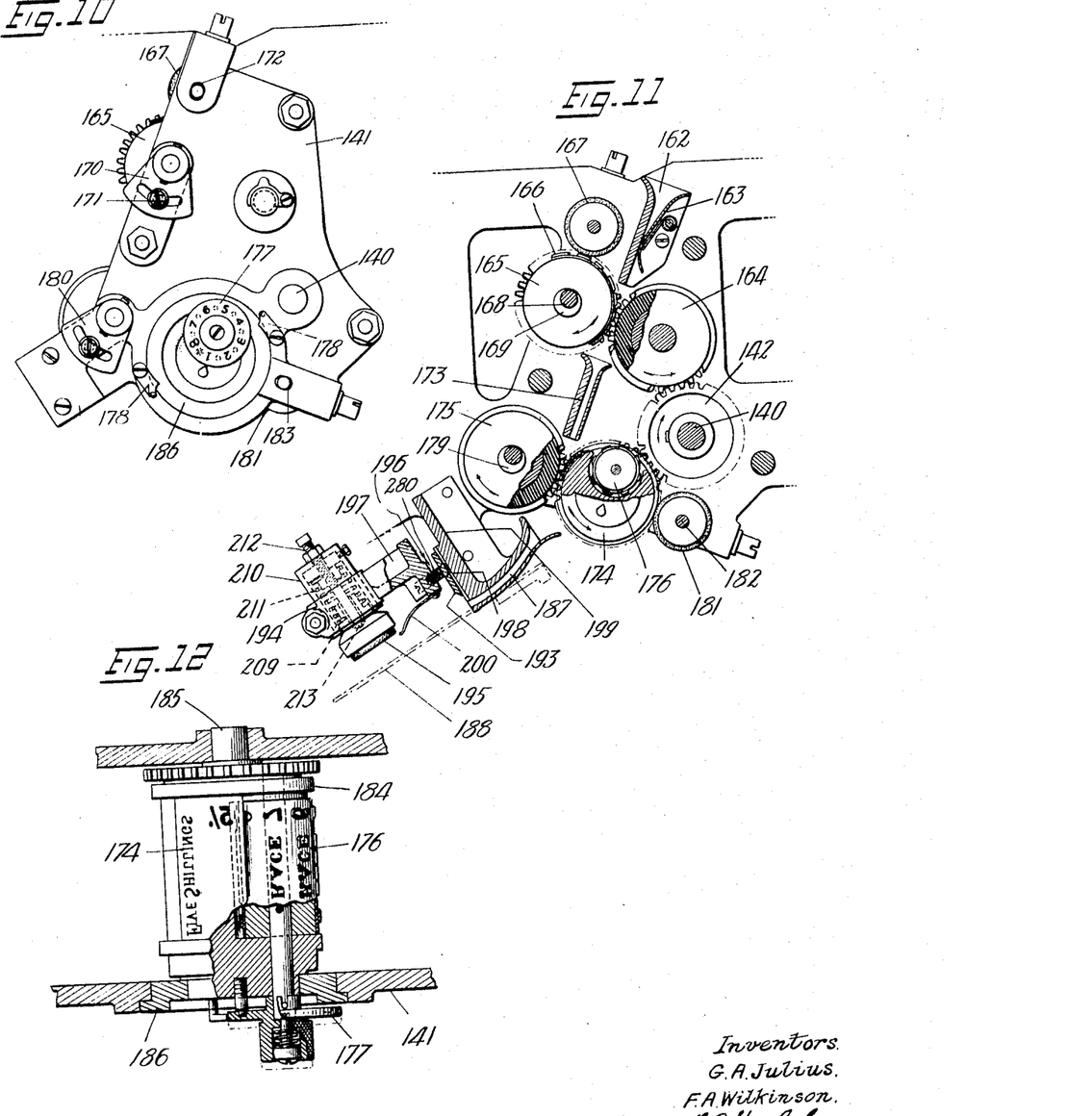
Fig. 10 is a side elevational view of the housing containing the ticket printing rollers, and showing the indicator for setting the rotary logotype barrel by which the "race" number is set.
Fig. 11 is a vertical section through the ticket blank feeding mechanism, ticket printing mechanism, and ticket cutting off mechanism.
Fig. 12 is a sectional elevation explanatory of the mounting of the rotary logotype barrel in the "race" printing roller.

Intermittent advancing motion is applied to the ticket strip by interrupted collars on the edges of the printing rollers, which collars bear against the face of the opposed platen rollers. This arrangement applied to the dating roller is seen in Fig. 12, where 184 are interrupted collars covering the same arc of the surface of the printing roller as the type face thereon, but standing very slightly higher than the type face. These collars bear against the edges of the ticket strip and bite it tightly against the platen roller, thus applying to it the necessary frictional grip to effect its advance movement, independently of frictional grip between the type face and the platen roller surface. As the type face and the interrupted collars are in contact with the platen rollers only during a portion of the rotation of said rollers, an intermittent feed is applied to the paper strip, which is in movement only while being printed. The strip is not moved during the period when the clearance arc between the type faces is passing the opposed platen rollers. The spindle 168 of the printing roller 165 is mounted in an eccentric bearing 169, which facilitates neat justification of the printing and feed grip pressure. The sector 170 with its set screw 171 is provided for rotating and locking the eccentric bearing 169.

After leaving the rollers 164—165 the ticket strip already printed on the rear side with the name of a company or such other matter carried on the type plates 166, the ticket strip continues its motion through the throat slot 173 which is belled at the upper end to provide an easy entrance, and thence it passes over the dating roller 174. This roller is geared to the transfer wheel 142 and is itself geared to its platen roller 175. As in the case of the roller 165 the type face carried on the roller 174 covers only an arc of its perimeter. There is therefore a coincident idle position in the rotation of these rollers during which forward feed movement is not applied by any of them to the paper strip. The position of these rollers is adjusted with relation to the rollers 164—165 and also with relation to the horse number printing mechanism, hereinafter described, so that all of these parts operate synchronously, that is to say that the printing of the ticket is effected in all cases while the paper is passing between the rollers, and when a printing operation is not actually in progress the paper strip is not in movement. The dating roller 174 carries fixed type matter and it is fitted with a pocket roller 176, which is armed with date or number plates around its circumference. This pocket roller 176 may be rotated in the pocket and set by means of the dial 177, which is fixed on its spindle, which is extended through the housing 141. Said roller is so mounted that it may be withdrawn from the housing with the roller 174 in which it is pocketed, by retiring the clips 178 which lock it therein. The platen roller 175 is carried on a spindle fitted in eccentric bearings 179 which are adjustable by a sector plate 180 similar to the sector plate 170 before described.

181 is an inking roller having its spindle 182 working a slot bearing 183 and kept up to the type face on the roller 174 by a light spring.

The detail construction of the pocket roller which carries the type faces for printing the date or race number or other variable particulars required to be printed on the ticket is exhibited in Fig. 12. The roller 174 is carried at its inner end on a spindle bearing 185 and at its outer end in a disk bearing 186, which disk bearing is held in the housing by the clips 178. When those clips are opened the disk bearing 186 and the roller 174 may be lifted out bodily, and replaced by a corresponding roller carrying other type.

As the ticket strip leaves the rollers 174—175 it passes into the guillotine throat 187. This throat directs it on to the forked tray 188, which is formed from a sheet of thin spring steel mounted on the offset end 189 of an arm 190. At its rear end this arm 190 is pivotally mounted at 191 on a pair of rocking arms 192, which carry the guillotine knife 193, and the holder 194 for the reciprocating pad platen 195. The guillotine knife 193 is mounted on a spring backed support 196, projecting rearwardly from the holder 194, the backing spring 280 keeping it in contact with the guide face 198 on the foot piece 199 which contains the guillotine throat in its lower part. A light spring 200 pinned to the underside of the bracket 197 bears on top of the ticket which is delivered on to the tray 188 before the platen pad 195 comes down into contact with the back of said ticket, to press it against the type face 207 (on the segment 208) which is in register with it.

Figure 13:
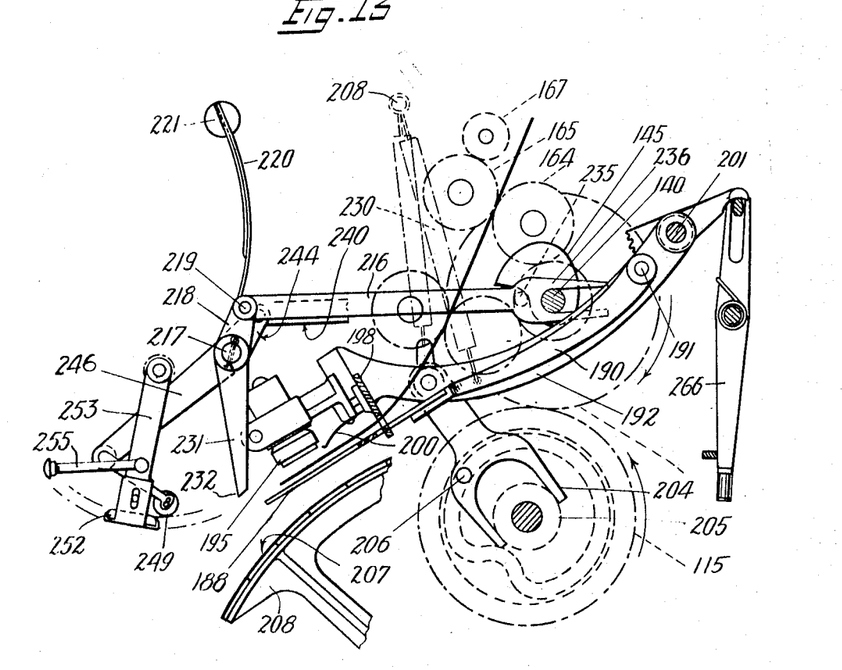
Fig. 13 is a semi-diagrammatic sectional elevation corresponding with the section shown in Fig. 11, with the addition of reinking and ticket ejecting mechanism, and is explanatory also of the operating connections by which the elements shown therein receive motion from other elements in the machine; this view shows the "idle" position of the parts, *i. e.*, as they stand after the completion of a movement in which a ticket has been printed and ejected.
Figure 14:
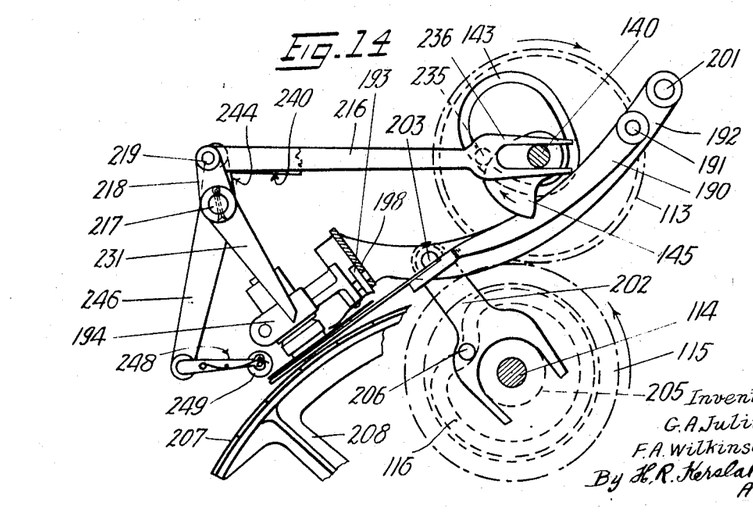
Fig. 14 is a semi-diagrammatic section to be read with Fig. 13 as explanatory of the altered position of certain of the parts shown therein as they appear at the moment of the printing of the horse number on the ticket.

The reciprocating platen arms 192 are fulcrumed on a fixed pin 201, forming a stage, the movements of which are governed by a forked bar 202 pivotally connected to it at 203. Forks 204 on this bar form a rider straddling a disk 205 on the shaft 114. An offset pin 206 runs in the cam groove 116 on the back of the wheel 115. A reciprocating downward and upward movement is applied to the arms 192 when the joggled portion of the cam 116 passes over the pin 206. This motion is timed to occur immediately after the ticket has been delivered on to the forked tray 188. When this delivery of the ticket takes place, the forward motion of the ticket strip is interrupted owing to the disengagement of the interrupted feed collars on the printing rollers with the faces of the opposed platen rollers, and the paper strip is therefore at that moment motionless. In the downward movement the ticket carried on the tray 188 is gripped by the spring 200; then the descent of the holder 194 continuing the ticket is severed from the paper strip following it by the guillotine knife 193, and simultaneously it is printed with the horse number by being pressed by the platen pad 195 upon the selected type face 207 on the segment 208, which face was brought into register with the platen pad 195 by the movement of the selector arm 78 manually. The platen pad 195 is formed with a spigot back 209 which is a loose fit in the cup 210, clamped in the holder 194. It is hung up in said cup by a helical spring 211 and gets its printing justification by means of an adjusting pin 212, the point of which bears in a seating 213 on the back portion of it. The spring 211 is adjustable for tension. The object of this detail construction is to hold the pad platen quite firmly, but still in such a way that it will find its own surface adjustment on the printing plates 207, so as to insure clear printing. There is sufficient clearance for the forks of the tray 188 between the printing plates 207. When therefore the tray 188 is depressed, the type surface can come flush or above the upper surface of the tray; this is desirable in order to effect clear printing of the ticket, without distorting the paper. The arm 190 is hung up by a helical spring 207 in tension from a fixed pin 208 on the frame. The forked tray 188, which it carries, sets up against the under part of the foot 199, as shown in Fig. 11. The relative position of the parts at the moment when the ticket strip is delivered to the tray 188 is seen in Fig. 13. The position when the downward motion of the arms 192 is nearly completed is seen in Fig. 14. In this downward motion the spring 200 bears the ticket down on the fork 188, and presses the fork down until it straddles the type face 207. The motion of the wheels continuing, the spring 200 is flexed upward, and the platen pad 195 applies pressure to the back of the ticket, thus causing it to take its print from the type face 207. In the rising movement of the arms 192 the parts restore themselves to the position shown in Fig. 15.

Figures 15, 16, 17, 18, 19, 20:
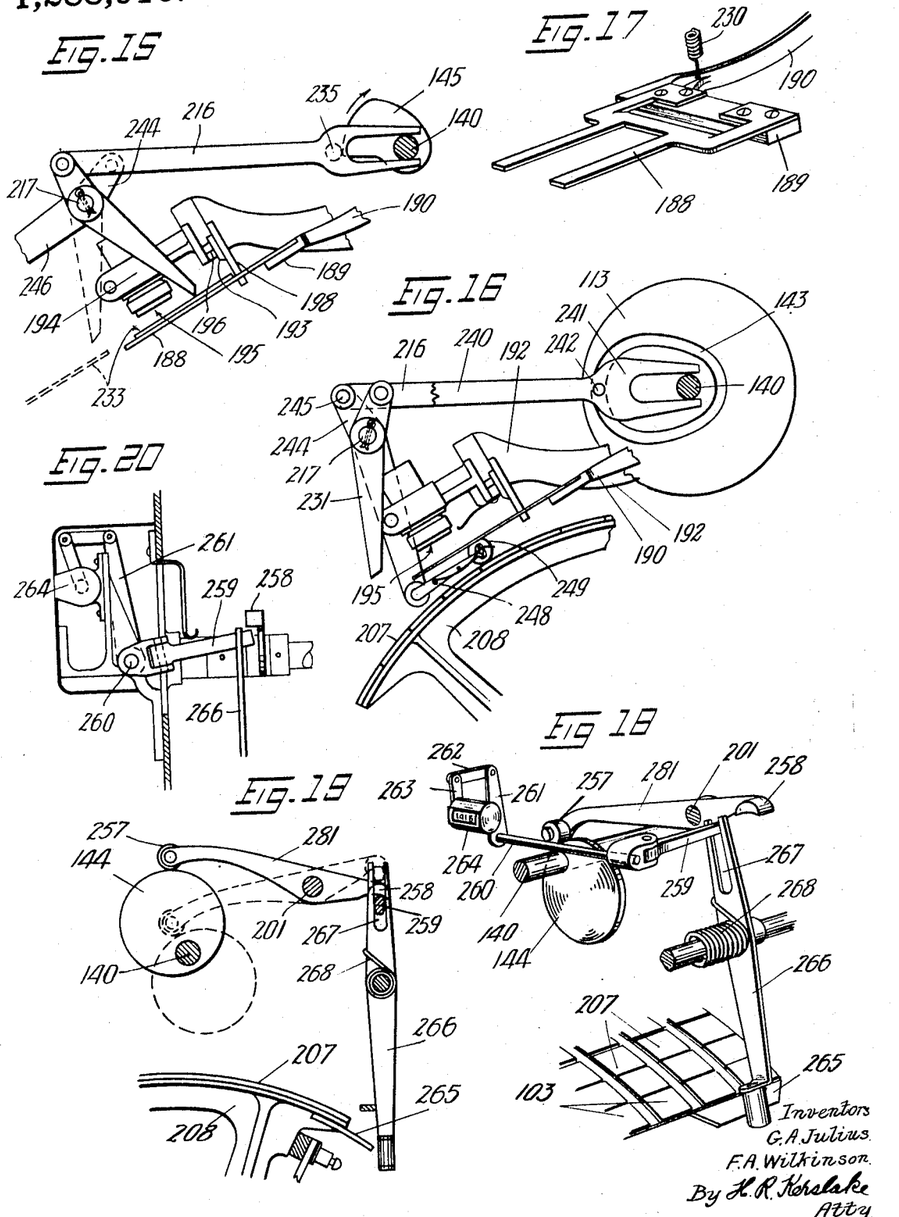
Fig. 15 is a fragment section to be read with Figs. 13 and 14, and is explanatory of the action of the ticket ejecting mechanism, the full and dotted lines respectively showing the positions of the ejecting fingers before and after they have performed the ticket ejecting movement.
Fig. 16 is a fragment section also to be read with Figs. 13, 14 and 15 as explanatory of the inking of the segment printing table immediately preceding the printing of the ticket with the horse number; in this case the inking roller is shown applying ink to the type on the selected type face on the segment; in the succeeding motions the inking roller is withdrawn, the ticket is printed on the inked type face of the segment, against which it is pressed by the plunger platen, and the ticket is subsequently cut off and finally ejected as per Fig. 15.
Fig. 17 is a perspective view explanatory of the construction of the fork tray which supports the ticket during the horse printing operation.
Fig. 18 is a perspective view of the mechanism for idling the local ticket counter automatically while "test" tickets are being printed.
Fig. 19 is a side elevational view of certain of the local ticket counter operating parts as they appear when in engaged position during printing of a horse number on a ticket.
Fig. 20 is an end elevation showing the local ticket counter and its connections to the operating rock lever.

Just before the printing of the ticket on the type face 207 is completed, the flicking fingers 231, which are sharpened and hardened at their ends 232 are moved backward, the progressive movement being seen consecutively in Figs. 13, 14 and 15. In Fig. 13 they are shown as at the beginning of the downward movement of the arms 192; in Fig. 14 while the printing pressure is on the ticket; and in Fig. 15 as the platen pad 195 is rising off the ticket. When the upward motion of the arms 192 is further advanced, the flicking fingers 231 are brought forward rapidly to the position shown in the dotted lines in Fig. 15. As, meantime, the upward tension of the spring 230 holds the fork tray upward, the points of the flicking fingers 231 are kept engaged in the ticket 233, and so the ejecting of the ticket (see dotted lines in Fig. 15) is effected with certainty. The motions of the ticket flicking fingers are controlled by the ticket ejector cam 145 on the shaft 140 of the wheel 113. This cam acts against an offset pin 235 on the guide fork 236, on the end of the push arm 216. The fingers are carried on a spindle 217 set in the frame, and their upward extensions 218 are pivotally connected at 219 to the outer end of the push bar 216. A leaf spring 220, the root of which is held in a fixed lug 221 on the frame, acts against the end of the push bar 216, tending to keep it in the extreme right hand position shown in Fig. 13. As the shaft 140 turns, carrying with it the cam 145, said cam acts against the offset pin 235 and forces the push bar 216 outward against the pressure of the spring 220, thus causing the ends of the fingers to move inward from the position shown in Fig. 13, through that shown in Fig. 14, to that shown in Fig. 15. Immediately the shoulder of the cam 145 passes the pin 235, the push bar 216 is quickly retired by the spring 220, and in this retiring movement the quick forward flicking movement required for the ejecting of the ticket is applied to the fingers 231, as will be clearly seen on reference to Fig. 15.

The inking of that one of the segment type faces 207 which has been brought into register with the platen 195 by the adjustment of the selector arm is accomplished by the inking mechanism actuated by the groove cam 143 on the wheel 113. The push and pull rod 240 is forked to form a guide 241 running on the shaft 140. This arm carries an offset pin 242 which runs in the groove cam 143. The rotation of the wheel 113, therefore, effects a reciprocating movement of the rod 240, according to the shape of the cam groove 143. This reciprocating movement is transformed into a rocking movement of the shaft 217 by means of an arm 244, which arm is articulated at 245 to the bar 240. The throw arm 245 keyed to the shaft 217 carries at its lower end a fixed pin 247, on which is fixed a pair of outwardly extending bracket arms 248. The inking roller 249 is carried in slot bearings 250 in the ends of the arms 248, and light springs 251 bear down on the roller spindle. Inward reciprocation of the arm 246 sweeps the roller 249 inward under the fork tray 188 so that the roller runs over the type face 267, which for the time being is set in register under the platen pad 195, the spring 251 causing the roller to press on the type surface with sufficient pressure to distribute a film of ink thereon sufficient to effect clean printing of a ticket in contact therewith (see Fig. 16). This reciprocating movement occurs shortly after the beginning of the rotation of the machine and before any downward motion of the tray 188 occurs so that ample clearance is afforded for entrance and egress of the roller 249 under said tray in the inking operation.

Figure 6:
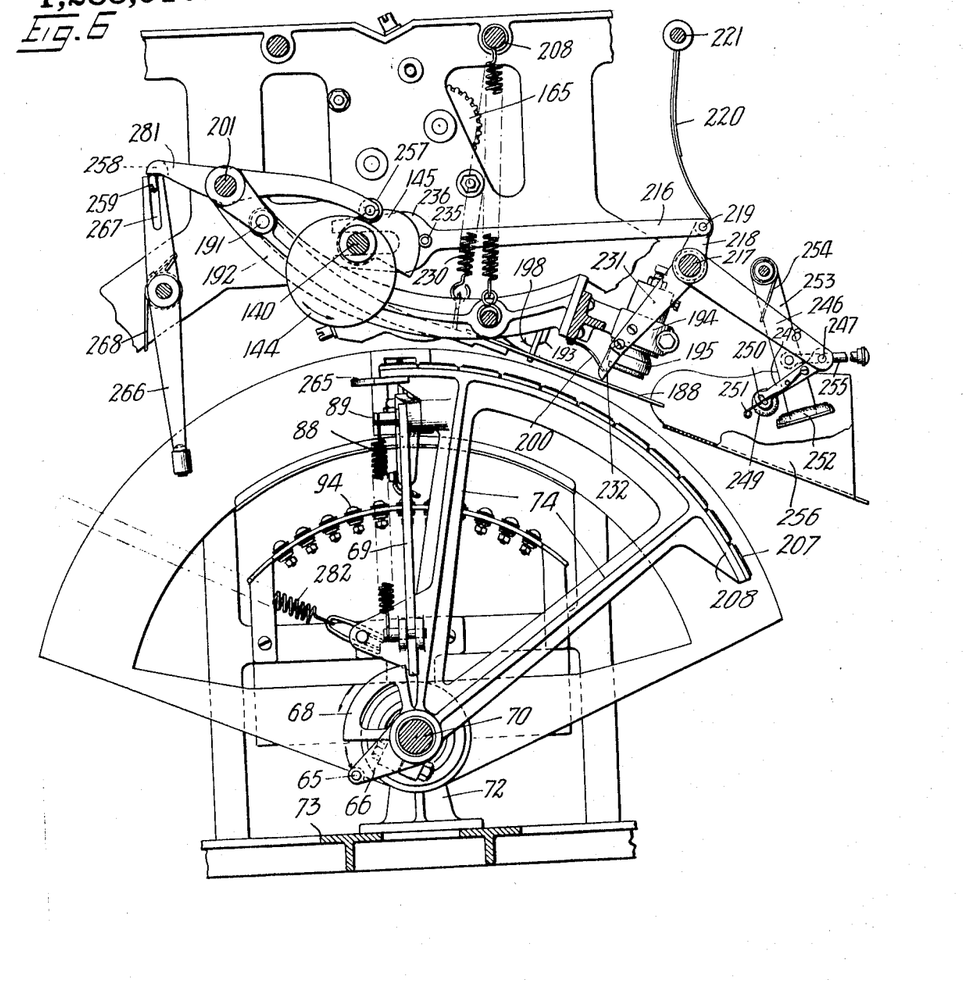
Fig. 6 is an incomplete longitudinal sectional elevation taken on the dotted line 6—6, Fig. 3, looking toward the tracker desk.

To replenish the roller 249 with ink, a reinking pad 252 is hung on a swing arm 253. The position of this arm is controlled by a wound spring 254 so that it is normally held upward in the position seen in Fig. 6. Reinking of the roller 249 is effected by pushing back the plunger 255 to swing it inward so as to rub the ink face of the pad 252 on the roller 249. 256 is a delivery chute into which the finished tickets are flicked from the tray 188.

The rocking lever 281 which is loosely fulcrumed on the spindle 201 carries at its inner end a roller 257, which runs on the eccentric 144, which is keyed to the shaft 140. At each rotation of the shaft 140, the lever 281 makes a reciprocation. Means are provided whereby that reciprocation is utilized to operate a local counter which records the total number of salable tickets issued from the machine. Provision is also made for cutting out the counter connection automatically when the selector arm is plunged on a test position for the purpose of issuing a test ticket, such ticket, as already explained, being marked as a canceled ticket and not having a horse number or other mark applied to it like ordinary tickets intended for sale to the public. The operator is, by means of this cut-off device, enabled to test the effectiveness of the machine without disturbing the record of tickets issued. On the outer end of the lever 281 is formed an offset claw 258, which normally engages the end of the pivoted arm 259, which is mounted on the end of a rocking spindle 260 which moves the rocking connections 261, 262, to the operating arm 263 of the counter 264. At each reciprocation of the lever 281, when the arm 259 is rocked under the claw 258, the spindle 260 is rocked, and an advance movement is applied to the counter 264. When, however, the printing segment 208 is moved to the test position (which is at one end of the said segment) a striker 265 attached to the segment engages the control arm 266, the upper end of which is forked as shown at 267 and forms a locator for the rocker arm 259. The lever 266 is normally held by the spring 268 so that the rocker arm 259 is engageable by the claw 258, but when the lever 266 is pushed outward by the striker 265, as shown in Fig. 18, the arm 259 is swung aside, and the lever 281 may then reciprocate freely without transmitting a record of its reciprocations to the counter 264.

This machine embodies a number of features of substantial practical importance. The principle of the segment 208 carrying individual type faces one for each competitor, corresponding respectively with the tracker desk positions allotted to the competitors and with the corresponding bank of electrical contacts, connection with which is made when the selector arm is plunged, provides a positive assurance that upon an issue of a ticket a record of the issue of it will be established at the distant totalizator. The interlocking of the electrical circuits through the series arrangements of the starting magnet with the horse magnets in the totalizator assures the idling of the ticket printer machine unless the recording circuit is in order. The continuous drive and automatic clutch engagement feature is important, inasmuch as one motor may be used to drive an indefinite number of ticket printing machines, each of which will take up its drive as soon as it requires it and disconnect the drive automatically. Loss of time in running up and braking off speed of an independent motor is thus obviated. The provision of means for the production of test tickets without operating the counter or sending an impulse to the distant totalizator is also of considerable practical importance. The effective locking of the whole plunger system when the arm is plunged so that the totalizator record will correspond exactly with the number of plunges made and tickets issued is essential for the purpose of obviating fraud, which can occur when a ticket printing or issuing machine contains a multiplicity of keys, two or more of which may be struck simultaneously so that although only one ticket may be issued, two or more recording impulses may be delivered to the distant totalizator. Mechanical elements in the machine which embody these and other features are severally identified in the claims.

We claim—

1. In a machine for printing tickets, a tracker desk with a plurality of dialing positions disposed symmetrically thereon, a type table carried on supports which permit it to be moved freely in the plane of its surface and held in a selected position by means of a manually operated selector arm, a plurality of type faces on said table arranged in complementary symmetrical order in relation to said tracker desk dialing positions, a selector arm carried by said table and movable manually over said tracker desk thereby to locate and lock said table in relation to any selected dialing position on said tracker desk, a platen, means for reciprocating said platen vertically over said table, means for applying ink to said type faces, means for introducing ticket blanks between said platen and table, and means for removing printed tickets therefrom.

2. In a machine for printing tickets, a segmental tracker desk with a plurality of dialing positions disposed symmetrically thereon, a segmental table carried on axial supports which permit it to be slidably and rotatably moved freely in the plane of its surface and held in a selected position by means of a manually operated selector arm; a plurality of type faces on said table arranged in complementary symmetrical order in relation to said tracker desk dialing positions, a selector arm carried by said table and movable manually over said tracker desk thereby to locate said table in relation to any selected dialing position on said tracker desk, a platen, means for reciprocating said platen vertically over said table, means for applying ink to said type faces, means for introducing ticket blanks between said platen and table, and means for removing printed tickets therefrom.

3. The combination with the elements set forth in claim 1, of a bank of electrical terminals wired through an electromagnetic recording device to one pole of a source of electricity and arranged symmetrically with the dialing positions on the tracker desk, an electrically conductive finger carrier on the selector arm and adapted to contact with one of said terminals when said arm is plunged, and an electrical connection so said finger from the other pole of said source of electricity.

4. In a machine for printing tickets in any one of several denominations, a plurality of type faces respectively corresponding with the ticket denomination markings and mounted on a table which is movable in the plane of its surface to bring the type face appropriate to the printing required into register with a platen, in combination with type inking, ticket feeding, and ticket ejecting means, and means for relatively moving said platen or table to press a ticket blank upon that type face which is located in register with said platen.

5. In a ticket printing machine, including a contact making device associated with a manual controller and co-acting with a bank of line terminals for closing electric circuits to a totalizator to operate electro-magnetic recorders therein respectively wired to said terminals, a quick break switch in a return line common to said circuits, and means associated with the printing elements for opening said switch before and for reclosing it after a circuit is broken at the terminal bank during the printing operation.

6. In a ticket printing machine, including a type table movable to register any one of a plurality of type faces thereon with a platen, and means for introducing ticket blanks between said table and platen, a register for recording the number of tickets issued, an operating connection between the printing elements and said register, a "test" type face on said table, and means controlled by the positioning of said table relatively to said platen for rendering the register connection inoperative while said test type face is in register with said platen.

7. In a ticket printing machine, a flexible forked tray adapted to support the lateral edges of a ticket blank, means for feeding a ticket blank onto said tray, a type block supported below said tray, a platen supported above said tray in register with said printing block, means for reciprocating said platen, thereby to press said ticket and tray toward said printing block with the tray forks straddling the printing block and the ticket blank contacting with the surface thereof, in combination with ejector fingers adapted to engage the edges of the ticket blank above the forks of said tray, and means for moving said ejector fingers backward over said blank while the platen is advanced and for rapidly moving said fingers forward to effect ejection of the ticket after the platen has been retired in its backward reciprocation from contact with the ticket.

8. In a ticket printing machine wherein a table carrying a plurality of type faces is located in register with a platen by means of a selector arm which is manually movable over a tracker desk having dialing positions thereon symmetrically arranged in complementary order in relation to said type faces, a contact making finger carried by said selector arm and a bank of line terminals connected with recording electromagnets, said line terminals being symmetrically disposed to correspond with said dialing positions, and adapted to close the magnet circuit when said contact making finger is moved by plunging the selector arm in register with a dialing position in the tracker desk.

9. In a ticket printing machine having manually controlled means for closing an electrical circuit through a selected line leading to a recorder electro-magnet in a totalizator, a starter electro-magnet in said printing machine normally connected in series with said recorder electro-magnet, means controlled by said starter electromagnet for unlocking the ticket printing machine, a source of electric current competent to energize said starter electro-magnet while it is normally connected in series with said recorder electro-magnet only when the starter electro-magnet is short circuited, a short circuiting switch, and mechanism operated by the printer elements for moving said switch to short circuit said starter electro-magnet after it has operated to unlock the printing machine and subsequently for restoring the lock and reconnecting said electro-magnets in series thereby to restore the magnet circuit to normal.

10. In a ticket printing machine, the combination of a primary drive shaft adapted to be maintained in constant rotation, a clutch adapted to engage said shaft to rotary motion elements in said machine, a manually controlled selector for bringing any one of a group of type blocks in said machine into printing register, a lock controlled by said selector, a sear normally held in idle position by said lock, a sear spring tensioned to bring the sear to engaged position, means operated by the releasing of the sear for engaging the clutch and mechanism actuated by the inertia of rotary elements in the machine for disengaging said clutch and resetting and relocking the sear in idle position at the completion of each cycle of operations.

11. In a ticket printing machine as set forth in claim 10 hereof, a lock consisting of a trigger latch engageable with the sear and controlled by an electro-magnet in a circuit which is closed by a finger on the selector arm when said selector arm is plunged manually, and which is reopened before the completion of each printing operation by the release of the selector arm.

12. In a machine for printing tickets including the elements set forth in claim 1 hereof, means for locking the selector arm, the circuit controller, and the printing table during the printing operation, consisting of a bolt associated with the selector, a rocking selector, and means controlled by a sear intermediate a lock and a clutch on the primary drive shaft for bringing said sector into the path of said bolt and thereby holding the selector in the plunged position during the printing operation, and for withdrawing it therefrom upon the completion of the printing operation.

13. In a ticket printing machine, a spindle, a sleeve rotatable and slidable thereon, a segmental table mounted on said sleeve, a group of type blocks mounted symmetrically on the face of said table, a platen mounted oppositely to the face of said table, a manual selector arm adapted for sliding and rocking said table about said spindle thereby to set a selected type block in register with said platen, and a tracker desk with dialing positions located thereon corresponding with the type block positions on said table.

14. In combination with the elements set forth in the preceding claim, means for moving a paper strip intermittently between said table and said platen, means for inking the selected type face, means for reciprocating said platen and means for locking the table in the selected position intermediately of the paper movements.

15. In a machine for printing tickets on a reeled strip of paper, an indorsing roller carrying a type face and interrupted collars co-acting with a platen roller, a paper guide directed between said rollers, a face printing roller with a type change roller pocketed therein, interrupted collars on said face roller and a platen roller co-acting therewith, paper guides between said first and second mentioned pairs of rollers, and between the latter and a fork tray, a movable table carrying type blocks adjustable below said tray to bring any selected one of said type blocks into printing register thereunder, a platen and a guillotine knife mounted in a carrier capable of reciprocating movement above said selected type block, and a ticket ejector adapted to engage a ticket on said tray and eject it after upward reciprocation of the platen has commenced; all said rollers being intergeared and timed to apply feed motion to the paper slip simultaneously with the printing of same therein and while the platen is raised after the ejector has operated.

In testimony whereof we have signed our names to this specification in the presence of two subscribing witnesses.

GEORGE ALFRED JULIUS.
FREDERICK AUGUSTUS WILKINSON.

Witnesses:
W. J. HUMPHREYS,
H. C. CAMPBELL.